(No Model.) 5 Sheets—Sheet 1.

W. H. EVANS.
MACHINE FOR MOLDING CIRCULAR AND OVAL OPENINGS IN PLUMBERS' SLABS.

No. 462,760. Patented Nov. 10, 1891.

WITNESSES
INVENTOR
William H Evans
by Wm N Finckel
his Attorney (No Model.) 5 Sheets—Sheet 2.

W. H. EVANS.
MACHINE FOR MOLDING CIRCULAR AND OVAL OPENINGS IN PLUMBERS' SLABS.

No. 462,760. Patented Nov. 10, 1891.

WITNESSES
INVENTOR
William H. Evans (No Model.) 5 Sheets—Sheet 3.
W. H. EVANS.
MACHINE FOR MOLDING CIRCULAR AND OVAL OPENINGS IN PLUMBERS' SLABS.
No. 462,760. Patented Nov. 10, 1891.
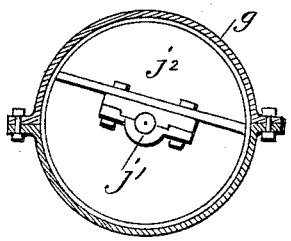
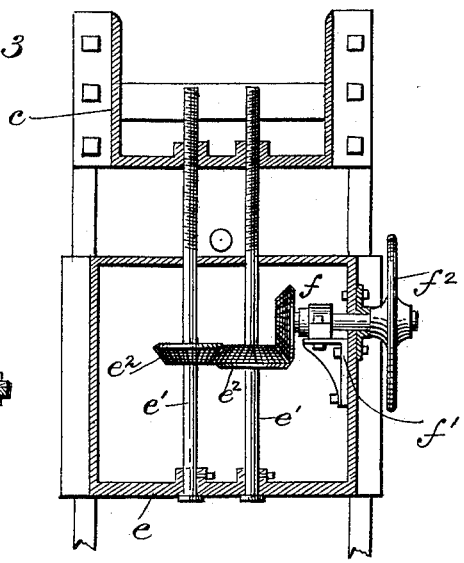
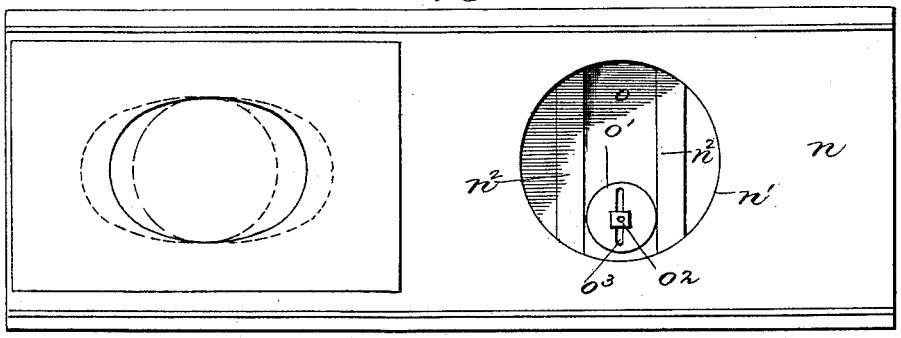
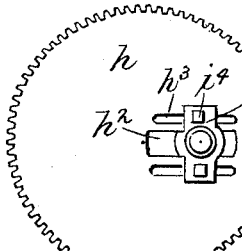
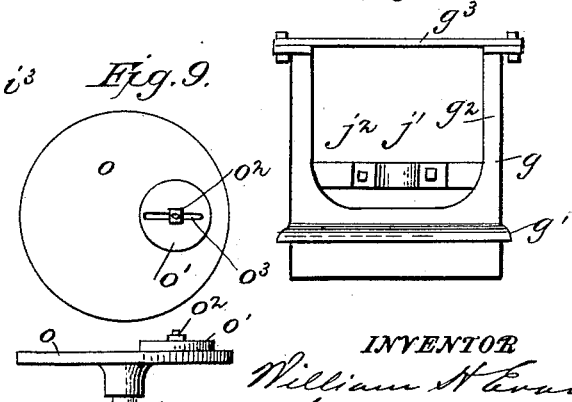
WITNESSES
F. L. Ourand
E. A. Kincaid
INVENTOR
William H. Evans
by Wm. N. Kincaid
his Attorney
THE NORRIS PETERS CO., PHOTO-LITHO., WASHINGTON, D. C.

(No Model.) 5 Sheets—Sheet 4.
W. H. EVANS.
MACHINE FOR MOLDING CIRCULAR AND OVAL OPENINGS IN PLUMBERS' SLABS.
No. 462,760. Patented Nov. 10, 1891.
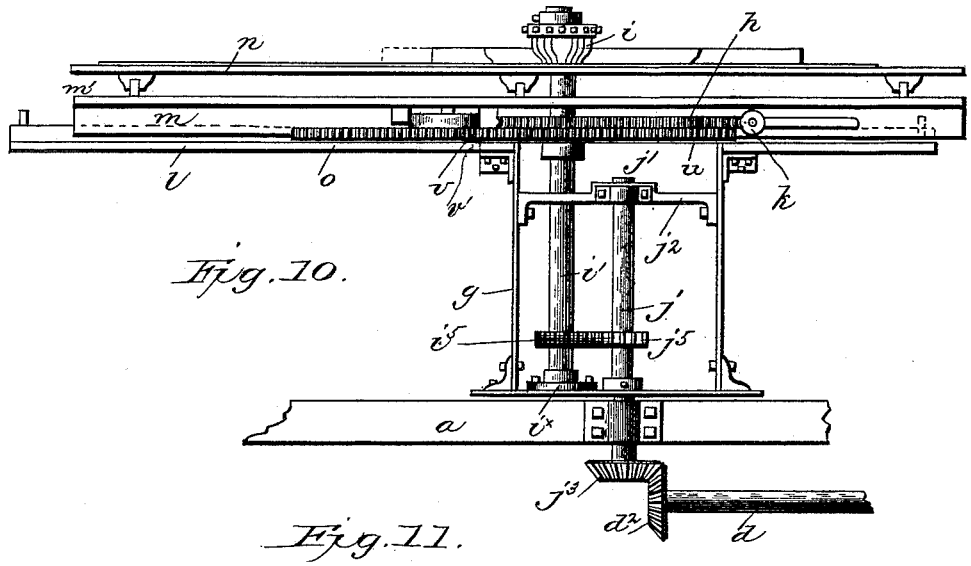
Fig. 10.
Fig. 11.
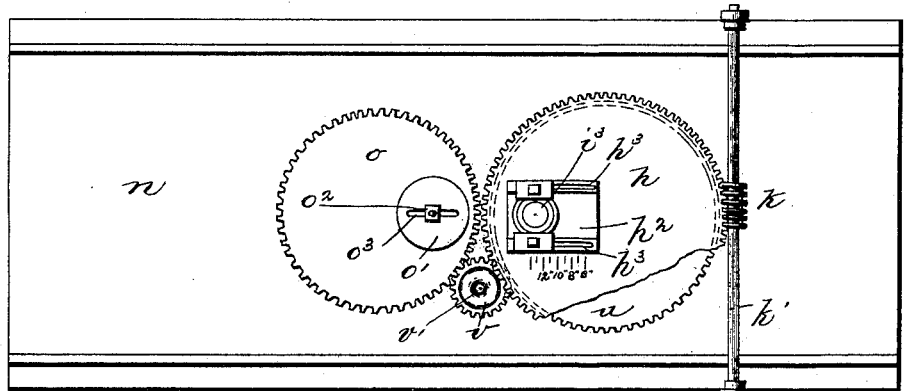
Fig. 12.
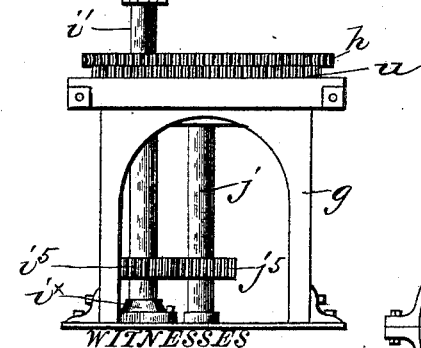
Fig. 13.
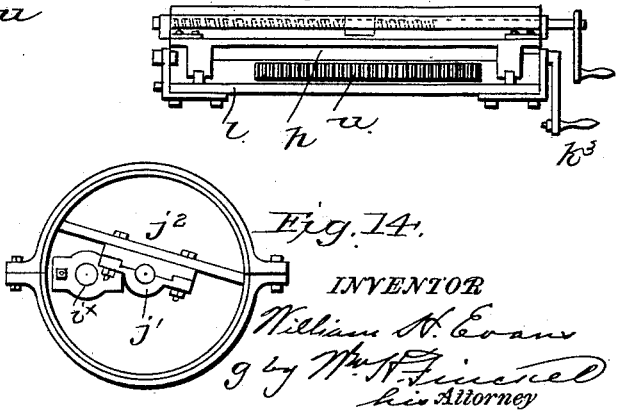
Fig. 14.
WITNESSES
F. L. Durand
E. A. Finckel
INVENTOR
William H. Evans
by Wm. H. Finckel
his Attorney (No Model.) 5 Sheets—Sheet 5.
W. H. EVANS.
MACHINE FOR MOLDING CIRCULAR AND OVAL OPENINGS IN PLUMBERS' SLABS.
No. 462,760. Patented Nov. 10, 1891.
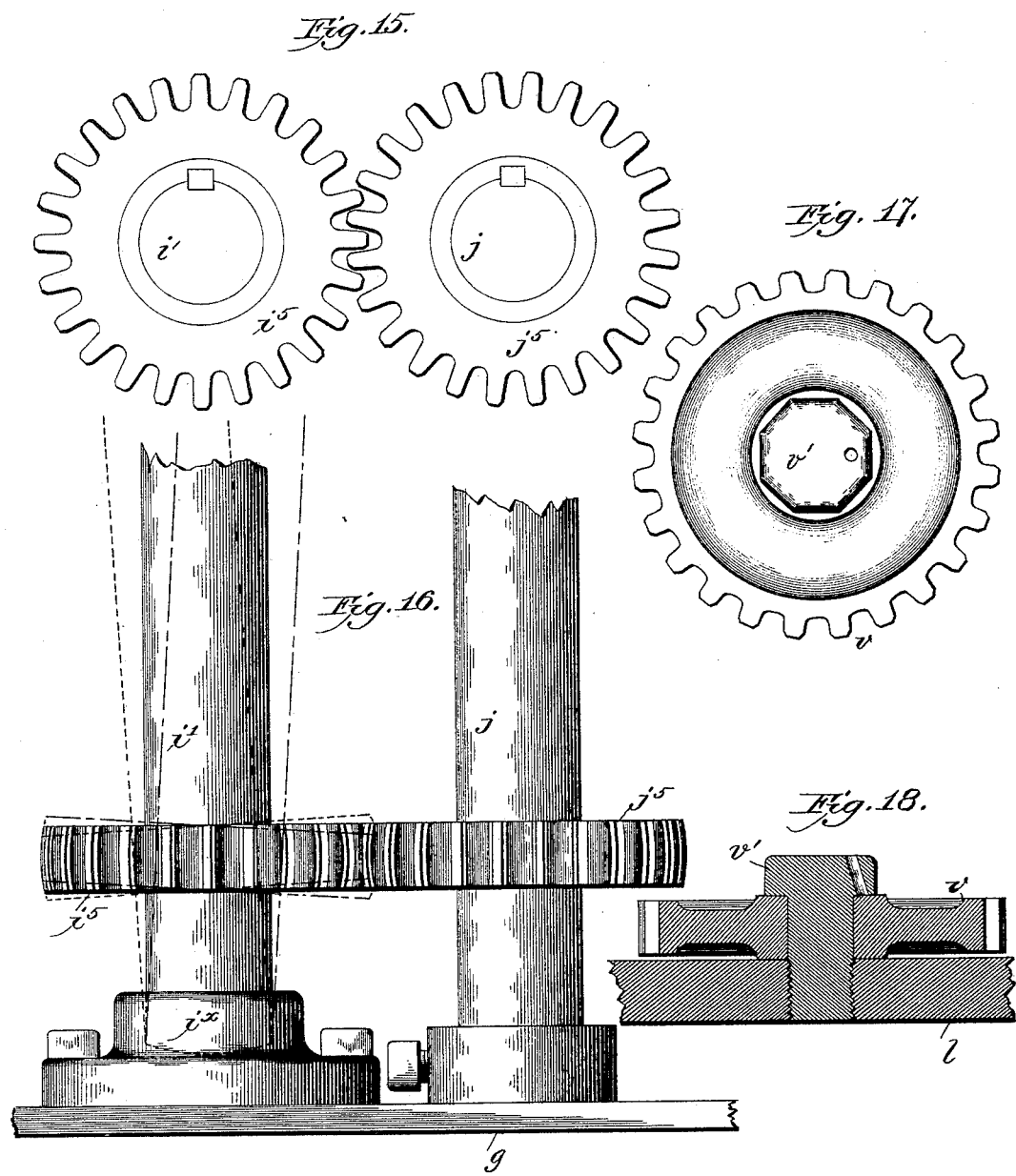
WITNESSES
INVENTOR
William H. Evans
by his Attorney

UNITED STATES PATENT OFFICE.

WILLIAM H. EVANS, OF BALTIMORE, MARYLAND.

MACHINE FOR MOLDING CIRCULAR AND OVAL OPENINGS IN PLUMBERS' SLABS.

SPECIFICATION forming part of Letters Patent No. 462,760, dated November 10, 1891.

Application filed June 30, 1891. Serial No. 398,000. (No model.)

*To all whom it may concern:*

Be it known that I, WILLIAM H. EVANS, a citizen of the United States, residing at Baltimore, in the State of Maryland, have invented a certain new and useful Improvement in Machines for Molding Circular and Oval Openings in Plumbers' Slabs, of which the following is a full, clear, and exact description.

The object of this invention is to provide a machine for forming the ogee or other shaped molding on the circular and oval openings in plumbers' stone slabs for washstands and the like.

In attaining the object of my invention I employ a rotary cutter-head having a circular movement and a work table or carriage normally stationary for circular work and capable of being moved in a right line to compound the circular movement of the cutter-head with a rectilinear movement of the table or carriage for oval work.

I will now describe in detail this principle of my invention and the best mode in which I have contemplated applying it, and will then particularly point out and distinctly claim the part or improvement which I claim as my invention.

Figure 1:
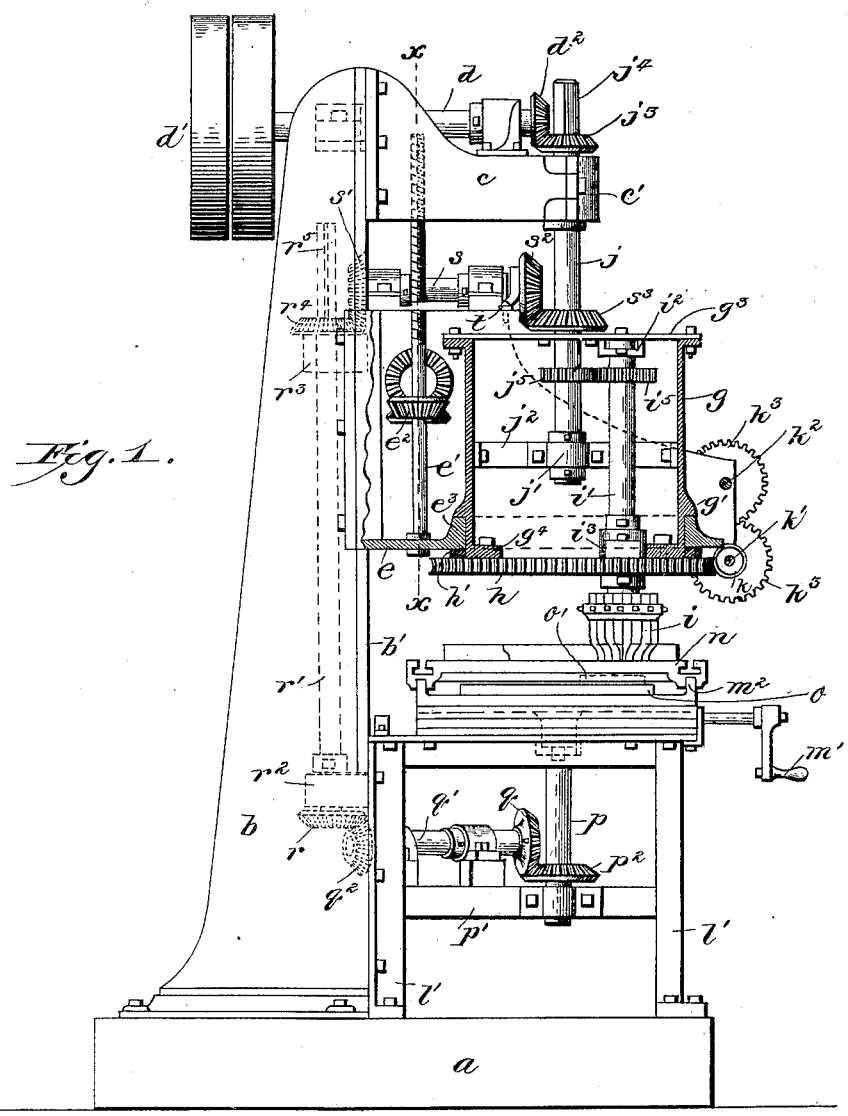
Figure 2:
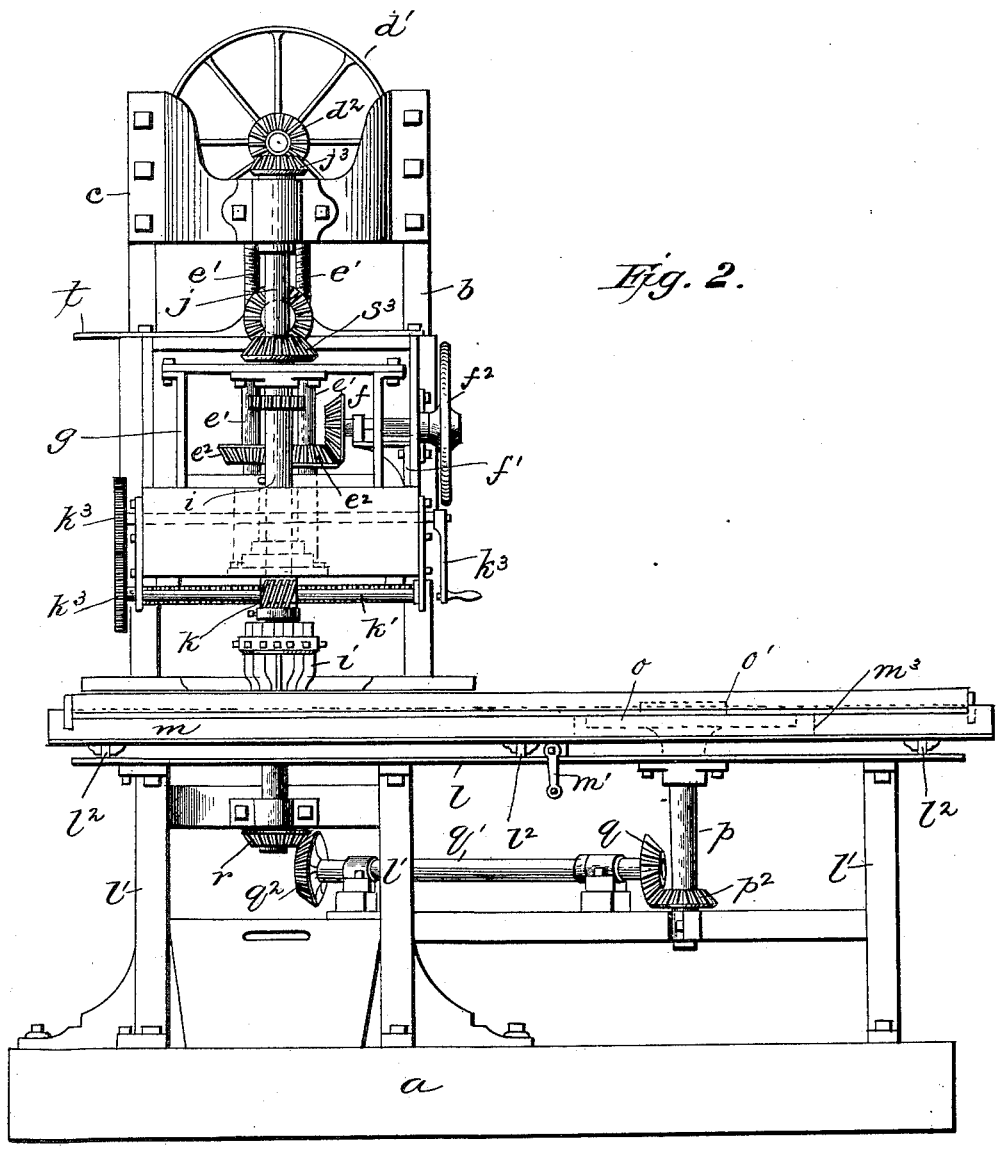

In the accompanying drawings illustrating my invention, in the several figures of which like parts are similarly designated, Figure 1 is a side elevation with the cutter-head carrier in section. Fig. 2 is a front elevation, the cutter-head carrier being in section. Fig. 3 is a section taken in the plane of line $xx$, Fig. 1. Fig. 4 is a plan of the work table or carriage with a slab thereon. Fig. 5 is an elevation of the cutter-head carrier detached. Fig. 6 is a cross-section thereof. Fig. 7 is a plan of the worm-gear which is used in rotating the carrier. Fig. 8 is a side view, and Fig. 9 a top view, of the reciprocator for the work table or carriage. Sheet 4 illustrates a modification, Fig. 10 being a sectional front elevation; Fig. 11, a top plan view; Fig 12, an elevation of the carrier and cutter-head detached. Fig. 13 is a side view of the table or carriage; Fig. 14, a cross-section of the cutter-head carrier employed in this form of the invention. Fig. 15 is a plan view of the deep-tooth gears. Fig. 16 is an elevation of said gears and portions of their shafts and the bearings for the latter. Fig. 17 is a plan view of the idler of Figs. 10 and 11, and Fig. 18 is a cross-section of such idler and one form of shifter therefor.

The letter $a$ designates a base of suitable construction, upon which is mounted a neck or frame $b$.

$c$ is a stationary head fixed to the neck and having bearings for a driving-shaft $d$, which is provided with the band-pulleys $d'$ and a bevel-gear $d^2$.

$e$ is a bracket fitted to and adapted to be slid up and down the neck upon ways $b'$. This bracket is provided with twin screws $e'$, which engage nuts or other threaded portions of the head $c$. The screws are connected by gears $e^2$, and one of these gears is engaged by a gear-wheel $f$ on a shaft $f'$, which is supported in the bracket and is provided with a hand-wheel $f^2$ to rotate said shaft, the train of gears $f$ $e^2$ $e^2$, and thereby the shafts $e'$ $e'$, and hence raise and lower the bracket. The bracket is made with a circular flanged opening $e^3$ in its bottom, and in this opening is fitted the cutter-head carrier $g$. This carrier $g$ is made as a cylindrical tube in one or more pieces, constructed with a shoulder $g'$ to rest upon the flange of the opening $e^3$, and one side is cut away, as at $g^2$, to permit access to its interior. The carrier is provided with a cap or cross-plate $g^3$, secured thereto by bolts or otherwise, and the bottom of the carrier is provided with a worm-wheel $h$, bolted to a flange or lugs $g^4$ on the said carrier. A packing-ring $h'$ is interposed between the worm-wheel $h$ and the bottom of the bracket $e$ to provide for lubrication and to ease the rotation of the carrier in said bracket.

The cutter-head $i$ is mounted upon a shaft $i'$, and this shaft is suspended from a bearing $i^2$ secured to the top plate $g^3$ of the carrier. A second journal box or bearing $i^3$ for the shaft $i'$ is arranged in a radial slot $h^2$ in the worm-wheel $h$, and this journal-box $i^3$ is adjustable in said slot by bolts $i^4$ fitted in slots $h^3$ in the worm-wheel. The box $i^3$ is made adjustable toward and from the center of the worm-wheel, which is the axis of rotation of the carrier, in order to increase or diminish the circular travel of the cutter-head to mold openings of greater or less circumference, and a scale (see Fig. 11) may be provided to assist in making these adjustments. The shaft $i'$ is provided with a deep-toothed cog-wheel $i^5$. (See Figs. 15 and 16.)

The main driven shaft $j$ is stepped in a box $j'$, which is supported upon a cross-bar $j^2$, fixed in the carrier $g$, and said shaft $j$ also has a bearing in the top cap $g^3$ of the carrier and a bearing $c'$ in the head $c$. The shaft $j$ is provided with a bevel-gear $j^3$ in mesh with the bevel-gear $d^2$ of the power-shaft $d$, and this bevel-gear $j^3$ is secured to the shaft $j$ by the spline $j^4$, so as to keep in mesh with the gear $d^2$ as the said shaft $j$ is moved up and down by the raising and lowering of the bracket $e$. The shaft $j$ is also provided with a deep-toothed cog-wheel $j^5$ in mesh with the similar cog-wheel $i^5$ on the cutter-head shaft to drive the latter shaft and permit it adjustment radially of the worm-wheel $h$.

The carrier $g$ is rotated to give the cutter-head its circular movement by means of a worm $k$, meshing with the worm-wheel $h$. This worm $k$ is mounted upon a shaft $k'$, which is supported in bearings in or on the bracket $e$. A second and parallel shaft $k^2$, similarly supported, is provided and it is supplied with a crank-handle $k^3$, by which it may be rotated. The shafts $k'$ and $k^2$ are connected by intermeshing cog-wheels $k^3 k^3$, so as to rotate together. The rotation of the carrier is effected by hand and as desired, although if the machine is to be run continuously or for any length of time on circular work only, said carrier may be run by power.

By the mechanism thus far described in detail it will be seen that provision is made for axially rotating the cutter-head, and also for rotating the cutter-head carrier and thereby moving the rotating cutter-head in a circular path.

A suitable work-support and the mechanism having the capacities of movement described constitute a machine for doing circular molding. In order to render the machine capable of molding oval openings, the work-support must be constructed to have a rectilinear movement. In one form of my invention this is accomplished as follows: $l$ is a bed supported upon standards $l'$ erected upon the base $a$. This bed is provided with ways $l^2$, which receive a carriage $m$, adapted to be traversed crosswise of the bed by a screw $m'$, as usual in stone-working machines. Upon longitudinal tracks $m^2$ of the carriage $m$ is arranged the carriage $n$, having capacity for longitudinal movement on said carriage $m$ and carrying the work. The carriage $n$ is made with an opening $n'$, crossed by parallel depending bars $n^2 n^2$. The carriage $m$ is also made with an opening $m^3$, and through this opening is passed a disk $o$. This disk is supported upon a shaft $p$, which has bearings in the bed $l$ and in a cross-bar $p'$ of the bed-frame. Upon the upper face of the disk is arranged an adjustable eccentric $o'$, secured to the disk by a bolt $o^2$, made fast to the disk and passing through a slot $o^3$ in the eccentric to provide for lengthening and shortening the throw of the disk as the eccentric is moved from and toward the axial center of the disk. The eccentric projects in between the cross-bars $n^2 n^2$, and hence as said disk is rotated the carriage $n$ is moved longitudinally.

The disk and its eccentric are herein referred to as a reciprocator for the work table or carriage. The reciprocator receives an intermittent movement as follows: Its shaft $p$ is provided with a bevel-gear $p^2$, which is engaged by a bevel-gear $q$ on a counter-shaft $q'$, which is suitably supported in the frame. The other end of this counter-shaft is provided with a bevel-gear $q^2$, which is in mesh with a bevel-gear $r$ on a vertical shaft $r'$, which is supported in a fixed bearing $r^2$ on the neck $b$ and a bearing $r^3$ on the bracket $e$. The bearing $r^3$ supports a bevel-gear $r^4$, connected with shaft $r'$ by a spline $r^5$ thereon, so that the said bevel-gear $r^4$ may travel up and down the shaft $r'$ as the bracket is adjusted. A counter-shaft $s$ is supported upon the bracket $e$ and has a bevel-gear $s'$ in mesh with the bevel-gear $r^4$, and another bevel-gear $s^2$ in mesh with a bevel-gear $s^3$ on the driven shaft $j$, so that the motion of the driven shaft $j$ is transmitted to the reciprocator-shaft $p$, and as the several intermediate bevel-gears are miter-wheels as well, it follows that all the shafts are driven at a uniform speed. The bevel-gear $s^2$ is splined to the shaft $s$, and is provided with a shipper-lever $t$, by which it may be thrown into and out of engagement with the gear $s^3$, according as it is desired to have the work-table move or remain stationary. Obviously in molding an oval opening the circular movement of the carrier will be availed of upon the circular portions thereof, and the reciprocator will be stationary. When the relatively straight portions of the oval are to be molded, then the circular movement of the carrier is stopped and the reciprocator is set in operation, thereby feeding the work to the cutter-head in straight lines, as the carriage-ways $m^2$ are straight. A machine constructed thus will discharge its own dust and prevent its accumulation upon the moving parts, which are arranged above the work. Where these features are not to be taken into the account, then the machine may be somewhat simplified and the cutter-head carrier arranged beneath the bead with the cutter-head projecting up through it, as shown in Sheet 4. The main differences between the two machines will be pointed out; but where the parts and their functions are substantially alike in the two machines, I designate them by the same letters. Upon the bed $a$ is mounted the carrier $g$, as it were, turned upside down and having its upper bearing in the bed. The cutter-head shaft is stepped in a bearing $i^x$ in the bottom of the carrier and supported in an adjustable box $i^3$ in the worm-gear $h$, which in this case is at the top of the carrier, or said box may be arranged in a cog-wheel $u$, which is secured to the worm-gear.

The reciprocator $o$ is made with a toothed or cogged periphery, and an idler-pinion $v$ is interposed between the cog-wheel $u$ and the reciprocator to transmit the motion of the former to the latter. The idler may be mounted upon a shipper-lever or other device to throw it into or out of engagement with the cog-wheel $u$ and reciprocator in accordance with the desire to mold oval or circular openings. I have shown this idler more in detail in Figs. 17 and 18 and as having a cap-bolt $v$ screw-tapped into the bed and removable at pleasure, in order to throw the cog-wheel and reciprocator out of gear. The carriages are essentially the reverse in arrangement from what are shown in Sheets 1, 2, and 3, but otherwise the same, and accordingly I have so lettered them.

Instead of the eccentric on the disk constituting the reciprocator, I might use an adjustable pin working in a slot in the work table or carriage; and other modifications of the reciprocator are obvious. So, also, many details of construction may be varied without departing from the principle of my invention as herein claimed.

What I claim is—

1. The combination of a cutter-head having a rotary motion, a revoluble carrier therefor imparting a circular motion to the cutter-head, and a work-support which is normally stationary, and means for moving it in a right line, substantially as described.

2. The combination of a cutter-head, a laterally-adjustable shaft therefor, a cutter-head carrier, a support therefor, and means to rotate said carrier, substantially as described.

3. The combination of a cutter-head and its shaft, a carrier therefor, means to rotate the shaft, means to rotate the carrier, and an adjustable journal-box for such shaft arranged in connection with the carrier to vary the circumference of the circular path of travel of the cutter-head, and thereby adapt it for molding curvilinear surfaces of different diameters, substantially as described.

4. The combination of a rotary cutter-head, a revoluble carrier therefor, a work table or carriage, a reciprocator for such work table or carriage, and means to rotate it, substantially as described.

5. The combination of a cutter-head, a shaft therefor, bearings for such shaft, one of which is adjustable laterally, a driven shaft, and gearing connecting these two shafts, and a revoluble carrier in which the bearings of the cutter-head shaft are arranged, substantially as described.

6. The combination of a cutter-head, a shaft therefor, bearings for such shaft, one of which is adjustable laterally, a driven shaft and gearing connecting these two shafts, a revoluble carrier in which the bearings of the cutter-head shaft are arranged, a work table or carriage, a reciprocator for such work table or carriage, and means to render it operative periodically, substantially as described.

7. The combination of a cutter-head, a shaft therefor, bearings for such shaft, one of which is adjustable laterally, a driven shaft, and gearing connecting these two shafts, a revoluble carrier in which the bearings of the cutter-head shaft are arranged, a work table or carriage, a reciprocator for such work table or carriage having an adjustable eccentric fitted to said work table or carriage, and means to render the reciprocator operative at intervals, substantially as described.

In testimony whereof I have hereunto set my hand this 27th day of June, A. D. 1891.

WILLIAM H. EVANS.

Witnesses:
PH. H. HOFFMAN,
N. CLARENCE ASHCOM.